Jan. 6, 1948. M. ELIE ET AL 2,433,838
SYSTEM FOR OBJECT DETECTION AND DISTANCE MEASUREMENT
Filed Dec. 30, 1939 6 Sheets-Sheet 1
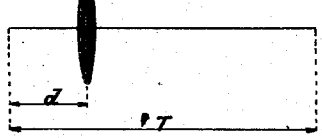
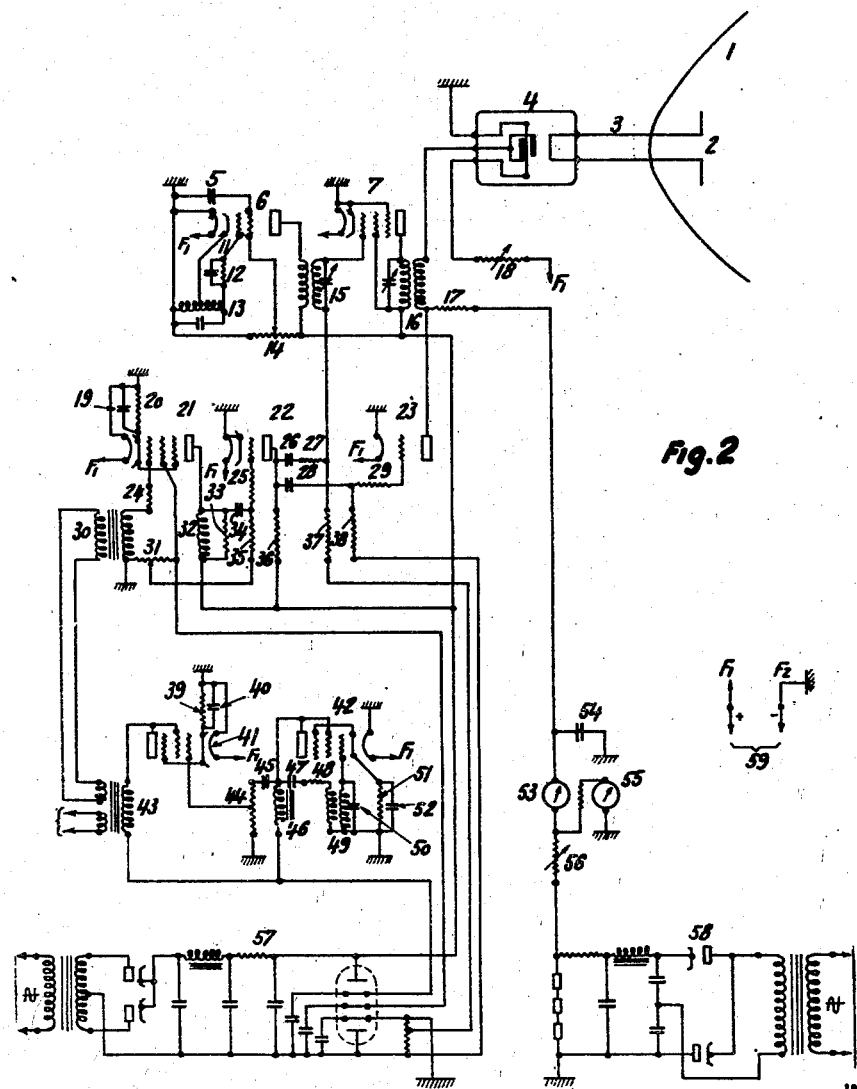
INVENTORS:
MAURICE ELIE
HENRI GUTTON
JEAN JACQUES HUGON
MAURICE PONTE
BY: Hazeltine, Lake & Co.
ATTORNEYS

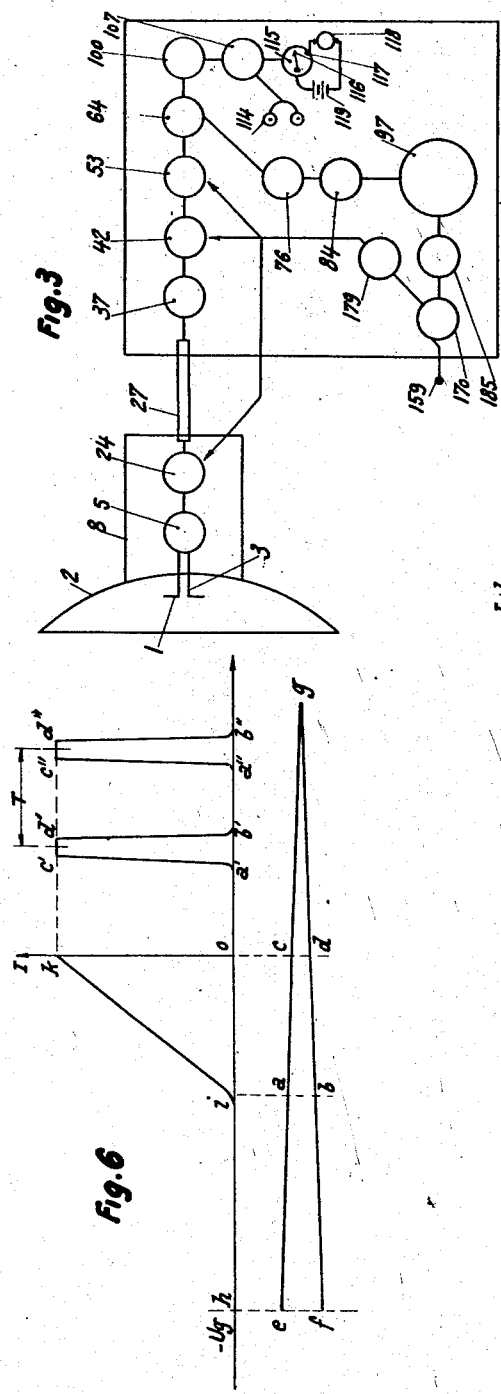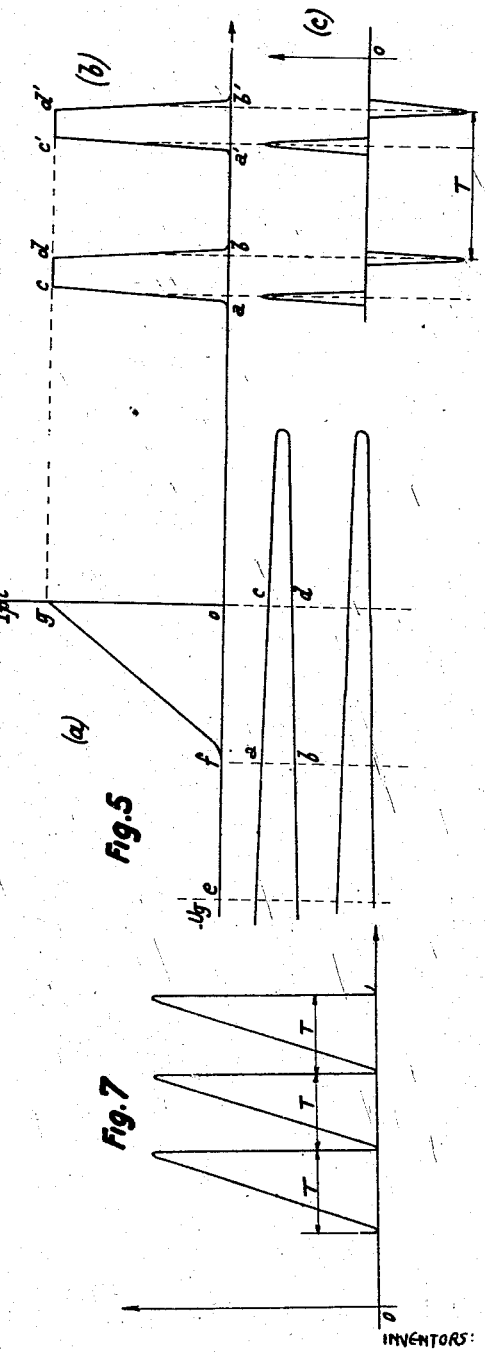

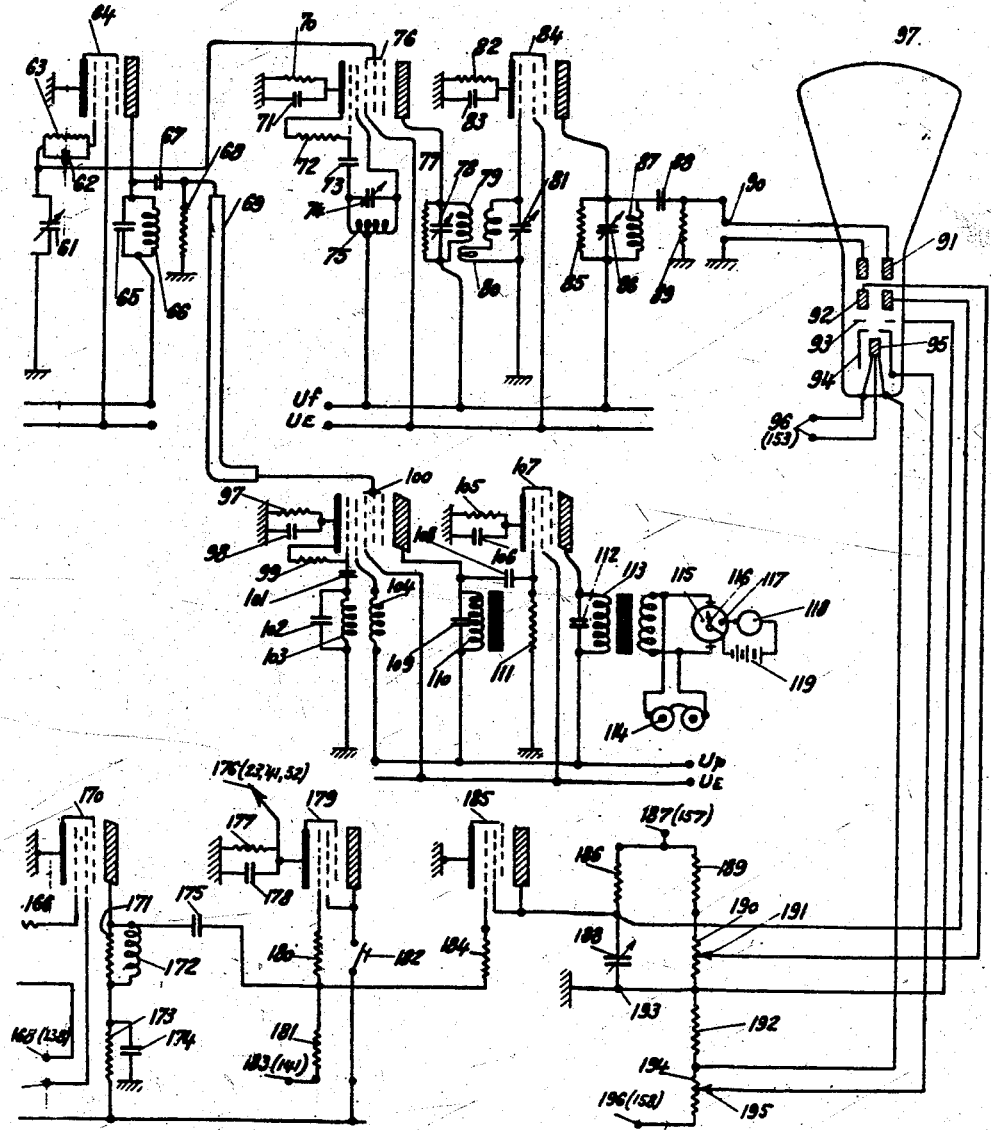

Jan. 6, 1948.   M. ELIE ET AL   2,433,838
SYSTEM FOR OBJECT DETECTION AND DISTANCE MEASUREMENT
Filed Dec. 30, 1939   6 Sheets-Sheet 5
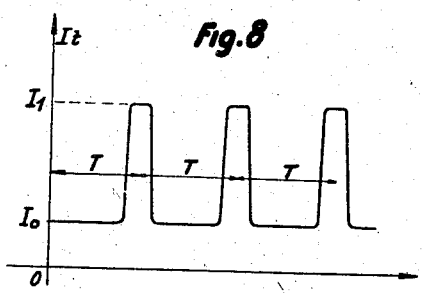
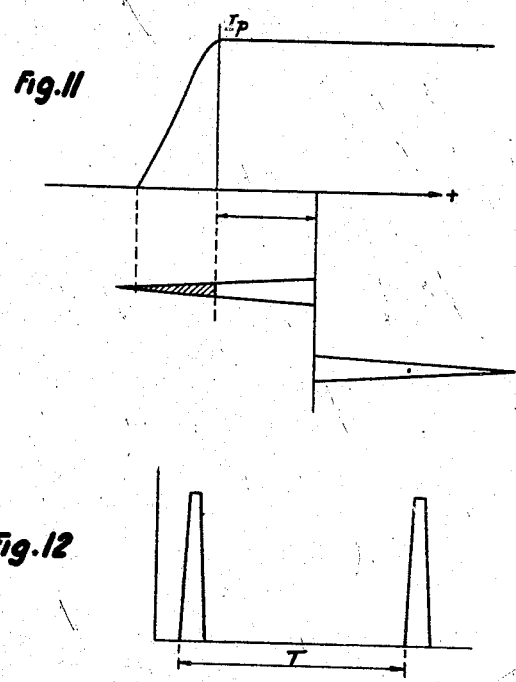
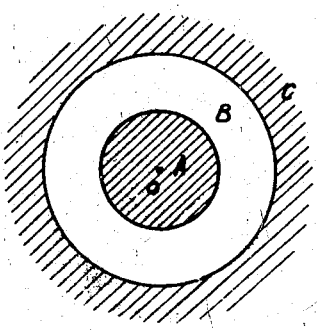
INVENTORS:
MAURICE ELIE
HENRI GUTTON
JEAN JACQUES HUGON
MAURICE PONTE
BY: *Haseltine, Lake & Co*
ATTORNEYS INVENTORS:
MAURICE ELIE
HENRI GUTTON
JEAN JACQUES HUGON
MAURICE PONTE
BY: Haseltine, Lake & Co.
ATTORNEYS Patented Jan. 6, 1948

2,433,838

UNITED STATES PATENT OFFICE 2,433,838

SYSTEM FOR OBJECT DETECTION AND DISTANCE MEASUREMENT

Maurice Elie, Henri Gutton, Jean Jacques Hugon, and Maurice Ponte, Paris, France; vested in the Attorney General of the United States Application December 30, 1939, Serial No. 311,860
In France December 1, 1938

10 Claims. (Cl. 250—1.66)

This invention is for improvements in or relating to a method for and means of detecting the presence and/or position of objects and obstacles and has for its object the provision of novel application of certain principles and devices known per se, as also various novel improvements therein. It enables the direction, the distance and possibly the altitude to be determined of a movable or stationary object not hidden by obstructions, or nearer objects rendered invisible either by fog, darkness or clouds. It is applicable in particular to the detection of objects at sea especially in foggy weather or in the darkness and to the detection of aircraft which may be manoeuvring possibly in the fog or above cloudy strata.

It employs the principle of reflecting the ultra-short electromagnetic waves from any object which is disposed in their path.

The principle of the present invention is as follows:

A decimetric wave emitted over a very short period is directed on to an object from which it is reflected; a receiver picks up the reflected wave and a device hereinafter described permits the time taken by the outward and return journey of the wave to be measured. The time measured is proportional to the distance of the object from the transmitter.

The arrangement of the device and its regulation are effected as follows: There are arranged side by side a transmitter and a receiver provided with directive aerials. The periodicity of the impulses of the transmitter is chosen so as to be equal to the time taken by the wave to complete the path from the transmitter to an object disposed at the limit of the range and back again. The duration of the impulse is very short compared with this period. During the transmission the receiver is blocked so that it can only receive the reflected wave. The blocking of the receiver is synchronised to the periodicity of the impulses of the transmission.

For the purpose of setting forth more comprehensively the features of the invention, the same is illustrated in the accompanying drawings forming part hereof.

Hence, referring to said drawings,

Fig. 1 is a diagrammatic view representing the synchronization of an electric high frequency signal by means of a crystal.

Fig. 2 is a circuit diagram of a magnetron transmitter embodying certain features of the present invention in practical form.

Fig. 3 is a diagrammatic plan of the assembled parts of the apparatus of the invention.

Figure 4A:
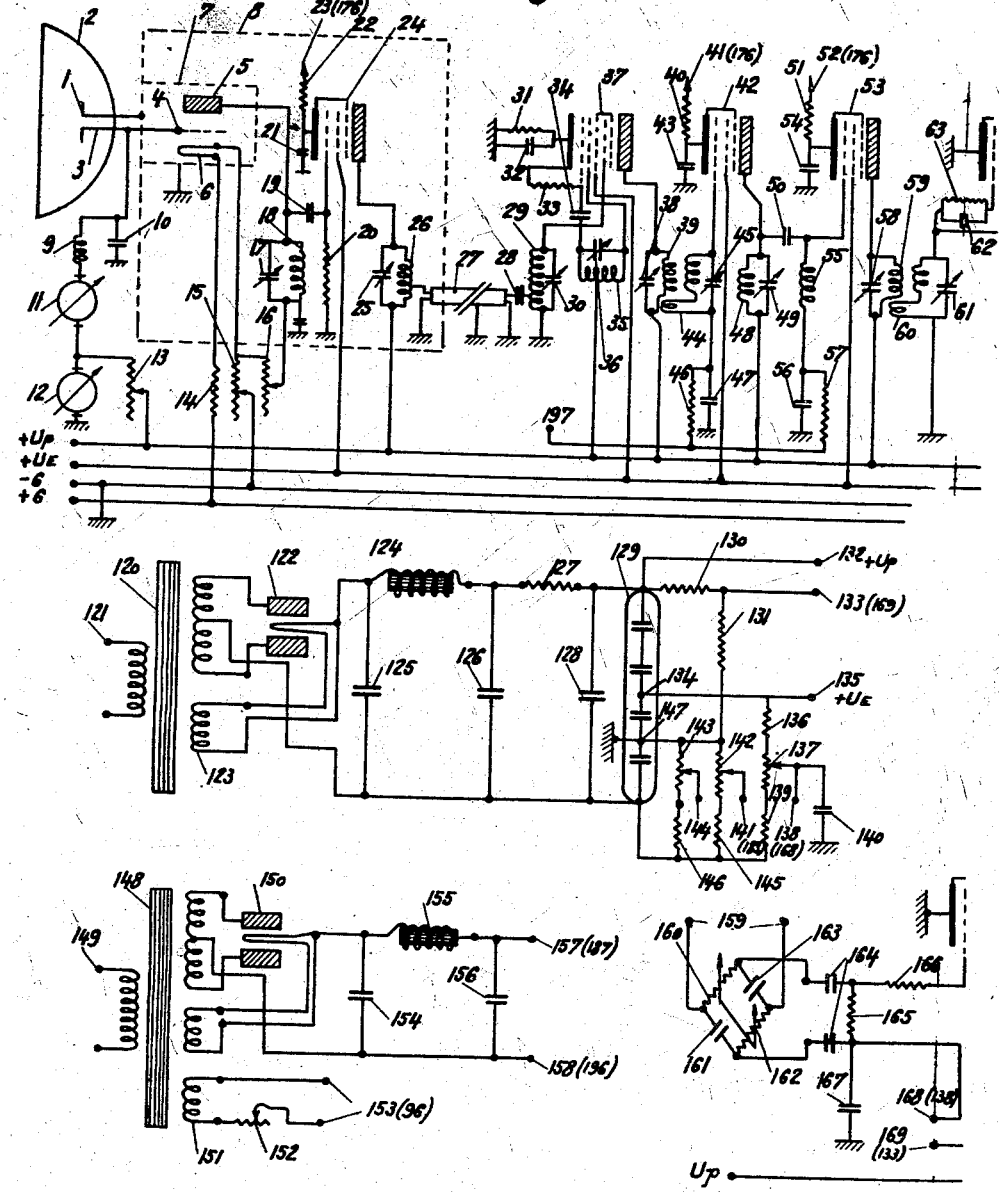

Figs. 4a and 4b taken together show a complete circuit diagram of the apparatus embodying the invention in all its features.

Figs. 5a and 5b are wave form and wave potential diagrams.

Fig. 6 is a wave potential diagram.

Fig. 7 is a wave form diagram.

Fig. 8 is another wave form diagram.

Figure 9:
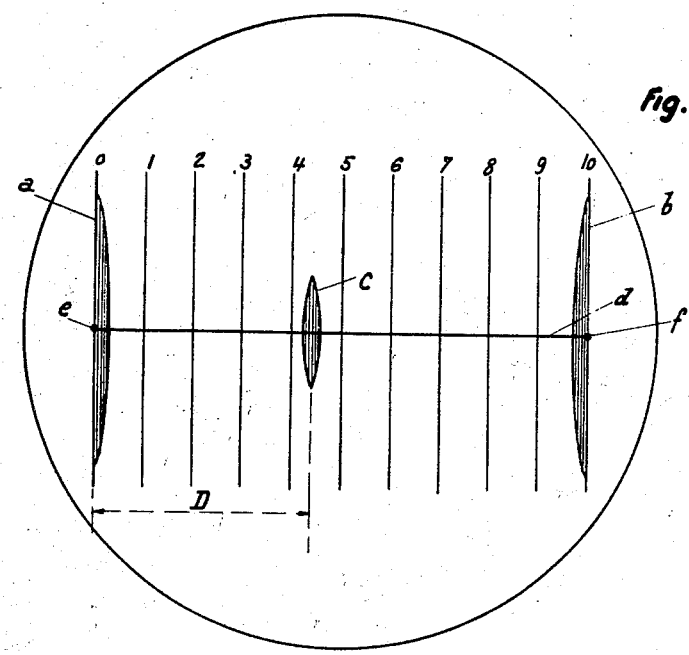
Figure 10:
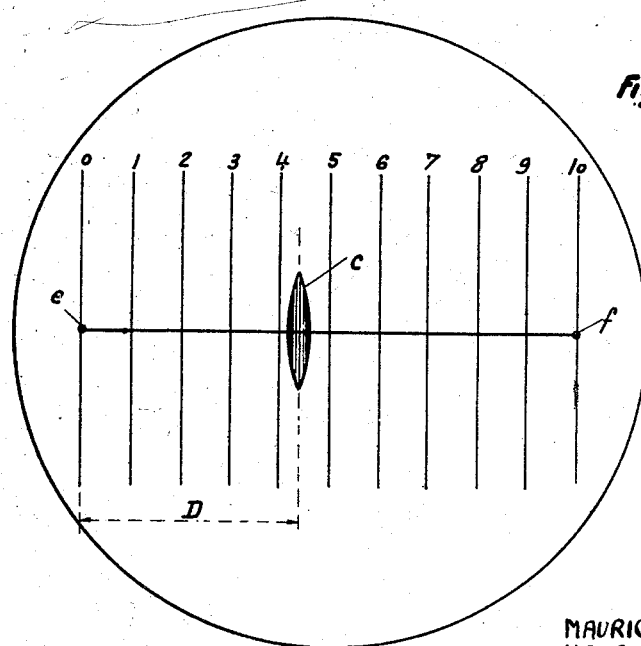

Figs. 9 and 10 are two somewhat similar views showing schematically how an image is presented on the screen of a cathode ray tube.

Fig. 11 is a potential diagram.

Fig. 12 is a further wave form diagram.

Fig. 13 diagrammatically illustrates a useful field zone of operation for the detector of the apparatus and one inner and one outer zone which are unused and out of range.

Throughout the views, the same references indicate the same or like parts.

The receiver amplifies the signal received and acts on the diverging plates of an oscillograph, the amplitude of which is synchronised with a common synchronisation potential (Figure 1). Thus, on the time axis, the impulse A of the spot occupies a position the distance $d$ of which from the source is proportional to the distance from the object, the length $T$ being the period of the synchronisation frequency corresponding to the maximum distance to be measured.

There will hereinafter be described an apparatus carrying into effect the above functions in accordance with the present invention.

A transmitter (Figure 2) is shown in the form of a magnetron, although such a type of generator is not obligatory. A magnetron 4 oscillating to a decimetric wave, is coupled to an aerial 2 disposed at the focus of the parabola 1, through the medium of a feeder 3. In this manner a directive radiation in the form of a narrow beam is obtained.

The heating current of the magnetron is provided from a source of potential 59 and is regulated by means of a rheostat 18. A magnetic field is produced either by an electromagnet or a permanent magnet. An anodic potential is supplied from a stabilised rectifier 58 through a resistance 17, the effect of which will be hereinafter explained. The potential is regulated by a rheostat 56 and its value is indicated upon a voltmeter 55 whereas the anodic current is indicated upon a milliammeter 53.

To facilitate the amplification in the reception, the magnetron oscillator is modulated to a lower frequency for which purpose there is provided a pilot oscillator with electron coupling constituted by a valve 6, an oscillatory circuit 13, resistances 12 and 14 and condensers 5 and 11, which produces an alternating potential of the desired frequency. The said potential through the medium of a transformer 15, having a tuned secondary, is transmitted to the amplifier stage constituted by a valve 7 and a transformer 16 having tuned primary. The secondary of the transformer 16 is arranged in series with the anode circuit of the magnetron and ensures the modulation of the latter by anode control. The anodic potential of the modulation valves is supplied by a stabilised rectifier 57.

According to the principle of operation described above, the emission is arranged so as to be produced in the form of synchronised impulses of short duration. To this end, the potential of the magnetron is kept at a sufficiently high volume so as to ensure that oscillations do not occur in the absence of the synchronisation potential. It is, in fact, a known property of magnetrons (see French Patent No. 748,674 of March 31, 1932) that, for a given magnetic field, commencing from a certain value of the anode potential, the amplitude of the oscillations decreases progressively from a maximum to zero, whilst the potential increases.

Simultaneously the amplification of the valve 7 is counteracted by the supply of a negative polarisation to its grid from the rectifier 57.

The emission is caused by reducing the anodic potential of the magnetron 4 by a quantity such that its point of operation is brought into the proper region. At the same time, the modulation valve 7 is unblocked by means of a positive potential applied to its grid. The two potentials necessary to ensure these operations are applied simultaneously for a very short time, and are produced by the impulse generator in the following manner:

There is applied to the grid of a valve 21 through the medium of a transformer 30 and of a resistance 24, a sinusoidal potential for synchronising the periodicity T of the impulses.

The corresponding variations of the plate current produce at the terminals of an inductance 32, shunted by a resistance 33, a potential the shape of which is shown by the curve illustrated in Figure 5. The operation of these elements is hereinafter described in detail in connection with the reception.

This potential is transmitted to the grid circuit of a triode 22 through a resistance 25 through the medium of a condenser 34 and a resistance 35. The end of this resistance opposite to the grid is raised to a positive potential with respect to the cathode. The value of the resistance 25 is very large as compared with that of the cathode grid space, so that the grid potential is fixed at a value approximately equal to that of the cathode potential.

Referring to Figure 11, it will be seen that the positive portion of the impulse has no effect on the plate current and that its negative portion only commences to act when its instantaneous value is greater, in absolute value, than the positive polarisation potential. The active part of the impulse is shown by the hatched portion; its duration, and, to a certain extent, its amplitude, diminish when the positive polarisation potential is increased. As a result impulses of positive potential, of the trapezoidal shape, as shown by Figure 12 are produced in the plate circuit, at the terminals of the resistance 36.

These impulses are transmitted on the one hand to the grid of a valve 23 through a condenser 28 and a resistance 38, and on the other hand to the grid of the modulation valve 7 through a condenser 26 and resistances 27 and 37. Thus, the valve is unblocked for the duration of the impulse and supplies a modulation potential to the terminals of the secondary of the transformer 16. The values of the condenser 26 and of the resistance 27 are selected in such manner that the modulation impulse and the unblocking impulse of the magnetron are in phase in the plate circuit of the latter.

The unblocking impulse of the magnetron is transmitted to it by the valve 23 in the following manner: The grid of the valve 23 is raised to a negative potential counteracting the plate current, this potential is supplied by the rectifier 57. The plate potential is taken in shunt with that of the magnetron through the resistance 17. In the absence of impulses there passes through the resistance 17 only the magnetron current and the potential drop is such that the magnetron is still in the region where it does not oscillate. When an impulse is applied to the grid of the valve 23 it produces a corresponding variation of the plate current, causing a variation of potential of the same shape in the resistance 17. The value of the resistance 17 and the curve of the valve 23 are selected in such manner that the drop of potential produced by the impulse of the plate current brings the point of operation of the magnetron into the region where it can oscillate. The role of the resistance 29 is to perfect the trapezoidal shape of the impulse, slightly deformed by the connection elements.

The synchronisation potential is supplied by a stabilised oscillator followed by an amplifier stage. The amplifier stage comprises a valve 42, a double inductance 49, one of the parts of which constitutes, with the condenser 50, the oscillating circuit, placed on the grid, and the other part serves as reaction winding. The plate is supplied through the inductance 46 and the connection between the plate and the oscillating circuit takes place through the condenser 47 and the stabilisation resistance 48. The grid is polarised through the resistance 51 to which the condenser 52 is connected in parallel.

The oscillations are transmitted to the grid of an amplifier valve 41 through a condenser 45 and a potentiometer 44. The grid of the valve 41 is polarised by a resistance 39 to which a condenser 40 is connected in shunt. The plate potential of the two valves is supplied by the rectifier 57. There is arranged in the plate circuit a transformer 43 with two secondaries supplying respectively the transmitter and the receiver.

The receiver will now be described with reference to Figures 3, 4, 5, 6, 7, 8, 9 and 10. Figure 3 gives a simplified diagram of all the elements, this permitting the operation of the receiver system to be understood in its main lines. The receiver parabola 2 contains the reception aerial 1 which is shown in the form of a ½ wave doublet but which can be arranged differently; the transmission feeder 3 is arranged to transmit the very high frequency to the detector valve 5.

The receiver case 8 is attached to the reflector 2 and 24 indicates a HF amplifier valve which is intended to amplify the frequency of modulation applied to the decimetric wave. The modulation frequency is conveyed by the high frequency feeder 27 connected to a valve 37 which is followed by two other amplifier valves 42 and 53. The valve 64 is a detector which permits of recuperating the chopping frequency, the period of which is T. This chopping frequency is received by the valve 100 where it interferes with a neighbouring frequency in such manner as to give a musical frequency which is amplified by the valve 107 and may be recognised by the headphones 114. This frequency transformation is introduced because with the chopping frequency (15,000 to 20,000 per second) necessary for the losses in the apparatus, the direct frequency received would be inaudible. The valve 107 is connected also to a voltmetric relay 115 which, commencing from a certain intensity of the signal received, closes the the contact 116, 117. The closing of this contact causes the operation of the luminous and audible signal 118 by means of the generator 119 (accumulator or secondary of supply transformer).

The detector valve 64 feeds before detection the mixer valve 76 which, after change of frequency, excites the vertical diverging plates of the cathode ray tube 97 by means of the amplifier valve 84.

It is known that, in order to ensure the proper working of the system, the receiver must be blocked during the transmission period; furthermore, the cathode ray tube 97 is subjected, on its horizontal plates, to a saw-tooth potential which effects a horizontal sweeping, the duration of which is precisely equal to the chopping period T (number of impulses per second). To effect these two conditions the receiver case comprises a valve 170 which generates narrow and triangular impulses, which is supplied, through the terminals 159, by the oscillator producing the chopping frequency of the period T, which is in the transmitter case. The impulses produced by the valve 170 cause on the plate of the valve 185, a saw-tooth potential which actuates the horizontal diverging plates of the cathode ray tube 97. The valve 170 actuates by its impulses, the blocking valve 179 the role of which is to give a rectangular impulse, the duration and phase of which can be regulated by means of manipulating members, which will be hereinafter described. The valve 179 acts on the valves 24, 42 and 53, blocks their plate current and in this way causes the complete counteraction or annulment of reception during the periods of transmission.

The complete arrangement of the receiver is shown by Figure 4. The members already shown on the synthetic diagram constituting Figure 3, have the same reference numbers on Figure 4. 1, 2 and 3 indicate the doublet receiver, the parabolic reflector and the transmission feeder for the very high frequency; 4, 5 and 6 show respectively the grid, the plate and the filament of a special charged grid valve which is particularly suitable for this kind of reception. This valve may, however, be replaced by some other type if the length of wave used for the emission is changed. The principle of operation remains, however, the same for a wide margin of variation of wave length. The feeder 3 supplies, on the one hand, the grid 4 of the detector valve, and on the other hand, a metallic screen 7 which serves as counterweight and permits furthermore an appreciable modification of whistling noises; 9 and 10 illustrate two filtering and stabilisation elements, 11 is a device indicating the current absorbed by the valve detecting ultra-short waves, 12 is a device indicating the continuous potential applied to the grid of the valve, 13 is a rheostat permitting the grid potential to be regulated, 14 and 15 show a fixed resistance and a rheostat permitting the valve saturation current to be regulated, and 16 is a rheostat permitting the negative potential of the plate to be fixed and of obtaining by this method, the best reception conditions.

The tuned circuit 17, 18 collects the frequency which modulates the very high frequency detected, whilst preserving the initial form of the impulse emitted by the transmitter system. The frequency of modulation which may be of the order of 3000 kilo-cycles for example is chosen in such manner that there is a sufficient number of periods over the duration of the impulse. The condenser 19 and the resistance 20 permit the alternating potential detected on the plate 5 to be transmitted to the grid of the amplifier valve 24. The cathode of the valve 24 is connected through the resistance 22 and terminals 23 and 176, to the cathode of the blocking valve 179; the arrangement of this blocking will be hereinafter described. There will be seen at 25 and 26 the elements of the tuned circuit of the plate of the valve 24. The potential at the modulation frequency which is found at the terminals of the tuned circuits 25, 26 is transmitted by means of the feeder 27, suitably coupled to the self-inductance 26, to the tuned circuits 29, 30 connected to the control grid of the mixer valve 37. The valve 37 varies the modulation frequency present on the control grid into a first intermediate frequency $F_1$ of shorter periods which is amplified by the two valves 42 and 53. 33, 34, 35 and 36 indicate the known elements of an oscillator arrangement for a mixer valve, and at 38, 39, 44, 45 the elements of a medium frequency transformer sufficiently strongly coupled to give a certain passing band. The resistance 46 and the condenser 47 constitute a high frequency filtering system for the grid circuit of the valve 42. There is in the cathode circuit of this valve a resistance 40 which is connected through the terminal 41 to the cathode of the blocking valve 179 and a filtering and stabilisation condenser 43. The amplifier valve 53 has its cathode circuit arranged in the same way by means of the resistance 51 and the capacity 54. The grid of this valve is supplied by the oscillating circuit 48, 49 through the coupling capacity 50 and the shock self-induction 55. The resistance 57 and the capacity 56 constitute a grid circuit filtering system. The resistances 57 and 46 are connected through terminals 197 and 144 to the potentiometer resistance 143 which regulates the negative potential applied to the grids of the valves 42 and 53. The potentiometer resistance 143 is controlled by the knob regulating the sensitiveness. The detector valve 64 is coupled to the valve 53 through the elements 58, 59, 60, 61 of a medium frequency transformer, and through a shunted resistance 62, 63. The secondary of the HF transformer 60, 61 also supplies the grid of a second mixer valve 76 which constitutes the first stage of the oscillograph amplifier. The second stage of this amplifier is constituted by the pentode 84. The oscillator elements 74, 75 permits collecting on the plate of the mixer 76 a second intermediate frequency $F_2$ which is higher than the intermediate frequency $F_1$, amplified by the tubes 37, 42 and 53 to be collected on the plate of the mixer valve 76. The mixer valve 76 is mounted in an absolutely normal manner and it is sufficient for the expert to just indicate the constituent elements 70, 71, 72, 73, 74, 75.

77, 78, 79 are the elements of a damped primary of an HF transformer and 80, 81 a secondary, not damped, which supplies the grid of the amplifier valve 84. The tuned circuit 86, 87 imposed on the plate of the valve 84 is damped by a suitable resistance 85. The damping resistances 77 and 85 have an important role on this amplifier. They dampen the circuits in such manner as to avoid the spreading of the spot on the screen of the cathode ray tube.

The vertical diverging plates 91 of the cathode ray tube 97 are supplied by the oscillating circuit 85, 86, 87 through a coupling capacity 88 and a resistance 89 which fixes their continuous potential.

There will thus be found the following elements in the "oscillograph" section: first the detector valve for ultra-short waves 5, then the valve 24 which amplifies the frequency F of modulation of the ultra-short waves liberated by the detection, then the transmission by the feeder 27 of the frequency F to the mixer valve 37 which transforms the modulation frequency F into a first intermediate frequency $F_1$, then the valves 42 and 53 which amplify the intermediate frequency $F_1$, then the mixer valve 76 which transforms the first intermediate frequency $F_1$ into a second intermediate frequency $F_2$, higher than $F_1$, finally the last amplifier valve 84 which amplifies the intermediate frequency $F_2$ and applies to the diverging plates 91 of the oscillograph tube 97. This amplification arrangement permits the impulse retaining the original shape which it had on emission; furthermore, the choice of the three frequencies F, $F_1$, $F_2$ is such that:

1. The detection of ultra-short waves by the detector valve 5 is not complicated by the fact of excessive lateral bands due to the modulation by the frequency F.

2. The amplifier system has an excellent stability (frequency at the end of amplification different from that of the commencement).

This condition is imperative if it is desired to have spots which do not spread corresponding to the amplitude from the fact of transitory phenomena amplified by the reactions.

3. The choice of the progressive frequencies F, $F_1$, $F_2$ is explained by the care which is taken to avoid the spreading of the spot, which is obtained by the combination of the devices adopted in feeding the deviation plates with a frequency much higher than the frequency of the impulses so as to have clear spot shapes without a tail.

In the plate circuit of the detector valve 64 there is arranged the circuit 65, 66 (self-inductance and condenser) which is exactly tuned to the frequency of the impulses. This tuned circuit is excited by shocks and reconstitutes a sinusoidal potential the period of which is exactly the interval which separates two impulses. This frequency being generally inaudible, is mixed in the valve 100 with a frequency which differs from it by ±800 periods. Elements 97, 98, 99, 101, 102, 103, 104 constitute the local oscillator of the stage. On to the plate of the valve 100 is connected a self-inductance 110 in shunt with a capacity 109 which eliminates the harmonics. The self-inductance 110 is dimensioned so as to collect the low frequency between 500 and 1000 periods which enables the LF harmonics to be eliminated and possible buzzing suppressed. The amplifier valve 107 is supplied through the self-inductance 110 through the coupling condenser 108 and the polarising resistance 111. The valve 107 delivers into the adaptation transformer 113 which comprises in its secondary a voltmetric relay 115 in parallel with the head-phones 114. The voltmetric relay closes, at a certain potential, the contact 116, 117 which effects the operation of the luminous or sonorous indicator 118 under the action of the battery 119.

There will now be examined the operation of the three valves 170, 179 and 185, the role of which is important in the arrangement according to the invention. The valve 170 constitutes the generator of impulses at chopping frequency; the valve 179 is that which causes the blocking of the receiver during the period of transmission; the valve 185 effects the horizontal sweeping of the cathode ray tube 97.

The impulse generating valve 170 is fed by the synchronisation oscillator of the transmitter, the frequency of which is exactly the number of impulses which are emitted per second. This synchronisation oscillator (valves 41 and 42, Figure 2) is connected by the terminals 159 to the receiver, and on the other hand supplies, as has been seen, the impulse device of the transmitter. Owing to this, the synchronism of the emissions of signals and blockages of the reception is absolute; only the phase of these operations is to be regulated at the time.

The synchronisation oscillator of the transmitter is connected by the terminals 159 to a bridge dephasing device 160, 161, 162, 163, the principle of which is known. This de-phasing device is itself connected through the medium of two capacities 163, 164 and resistances 165 and 166 to the polarised grid of the valve 170. The polarisation which exists in 168 is caused by the potentiometer resistance 137 and through the medium of the terminal 138; it is seen from the diagram that this polarisation may be positive or negative. The drawings of Figure 5 show how these impulses, the principal of generation of which is known, are produced. Figure 5a shows at $fg$ the characteristic of the valve 170; at $abcd$ a portion of a sinusoid at the chopping frequency, and at $e$ the point of polarisation given by the potentiometer resistance 137. The shape of the current which is produced in the plate circuit of the valve 170 is indicated at $b$ of Figure 5; the flat portion $cd$ is caused by the passage of the direct grid current in the resistance 166. In the plate circuit of the valve 170 there is a self-inductance 172 specially dimensioned, and a damping resistance 171; the resistance and condenser elements 173, 174 serve only to avoid disturbances in the other parts of the receiver. By virtue of the well-known law $$E = -L\frac{dI}{dt}$$

it is seen that the potential which arises at the terminals of the self-inductance 172 is of the shape shown at ($c$). It is seen that there are obtained triangular impulses the width of which at the base is determined by the valve and circuits used; there necessarily exist positive and negative impulses which form groups of two; each group is separated, in time, by the period T which is precisely the interval which separates two transmission impulses; the period T thus separates two positive impulses or two negative impulses. It will be seen at once that by acting on the dephasing system 160, 161, 162, 163, the dephasing is caused, with respect to the impulses of emission, of the impulses controlling the blocking and the sweeping of the receiver. The effect of the variation of the grid polarisation of the valve 170 appears immediately on examination of the Figure 5a; the points $a$ and $e$ shift on the sinusoid $acdb$ and cause a progressive dephasing of the impulse. This arrangement, however, forms the object of a previous patent filed in France on February 16, 1938, for "Process for the dephasing of impulses of very short duration." It is this arrangement which is applied in the present case to perfect in a suitable manner the placing into phase of the blocking with the periods of transmission. The screen potential of the valve 170 is fixed by the two resistances 130, 131 which are between the +HT and the mass of the principal rectification; the terminals 133 and 169 are connected together by this end. In recapitulation, it is seen that the valve 170 produces triangular impulses the interval of which, between impulses of the same sign, is precisely equal to the interval between two impulses to transmission and the phase of which may be regulated roughly by a bridge dephasing device and then more finely, by a variation of grid polarisation.

The valve 170 actuates the grids of the valves 179 and 185 through the capacitative element 175 and the resistances 180 and 184.

The valve 179 produces square impulses, the duration of which can be regulated and the period of which is that of the triangular impulses. In the cathode circuit of the valve 179 there is a resistance 177 in shunt with a suitable condenser 178. The resistance 177 is introduced into the cathode circuits of the valves 24, 42 and 53 by means of the terminals 23, 41, 52 connected to the terminal 176. Figure 6 illustrates the operation of the blocking device: there is shown at efg a positive triangular impulse, at ik, the characteristic of the valve 179, and at h the polarisation Ug which is adjustable and is given by the potentiometer resistance 142, through the terminals 141 and 183. It is seen that the shape of the plate current of the valve 179 is trapezoidal and that the bases a'b' and c'd' are precisely equal to the times ab, cd determined on the triangular impulse afg by the verticals iab and ocd. It will be immediately seen that the width ab, cd of these bases may be made variable by the simple variation of the polarisation Ug caused by the potentiometer resistance 142. This point is very important for it shows that the arrangement adopted permits of a very convenient and very precise regulation of the duration of blocking of the receiver during the time of emission. This results in the possibility of restricting the action of the detector to given regions and consequently of permitting the action of more or less adjacent obstacles to be eliminated. Thus (Figure 13) the detector being at 0, the region which surrounds it is divided into three zones: a zone C located externally of the limit of range, an intermediate zone B, a useful zone where the obstacles may be detected and a zone A for which the detector is made inoperative. The resistance 180 plays the same part on the valve 179 as the resistance 166 on the grid of the valve 170: it causes the crests c'd', c''d'' of the trapezoids (Figure 6) following such other, to be perfectly flat. The diagram of Figure 8 shows the shape of the current which flows in the blocking resistance 177; there is shown at Io the current of the valves 24, 42, 53 for the maximum of sensitiveness, at I₁ the total current at the moment of the blocking impulse. The positive potential resulting therefrom is of the same shape and determines the blocking of the valves during the times of emission by positive potential applied to the cathodes.

The screen and the plate of the valve 179 connected together may be cut from the HT supply by the switch 182. This switch enables the blocking to be suppressed, which is utilised to ensure a convenient regulation, before the placing into operation, of the receiver on to the local reflections or onto the direct radiation of the transmission parabola on to that of reception.

The sweeping and regulating device of the cathode ray tube thus comprises the valve 185 and the system of resistances and condensers numbered from 184 to 196. The device which enables the saw-teeth formation to be obtained, which are shown on Figure 7, comprises the resistance 186 of high value, in series with the variable condenser 188 which is controlled by a knob and determines the scale of the distances on the screen of the cathode ray tube 97. The resistance 186 is connected, through the terminal 187 to the feed 157 of the special rectifier, the elements of which are numbered 148 to 158, which rectifier only serves to supply the cathode ray tube. Between the terminal 187 and earth there exists a definite potential caused by the elements 189, 190, 192 and 194 which is such that it enables the condenser 188 to be charged at almost constant current. The discharge of the condenser 188 is caused by unblocking the valve 185 at the moment of the positive impulses of the impulse generator 170. One of the plates of the condenser 188 is connected to one of the horizontal diverging plates of the cathode ray tube; the other diverging plate is connected to the variable terminal 191 of the potentiometer resistance 190 which permits a source of sweeping potential e to be obtained (Figures 9 and 10) which is symmetrical, with respect to the centre of the screen from the extremity f where the return of the spot is produced. The fixed resistance 192 and the potentiometer resistatnce 194 permit respectively the cathode negative potential to be obtained and the variable potential of the concentration grid 94. The terminal 196 is connected to the special rectifier terminal 158 (—HT); the heating terminals 96 of the cathode ray tube are connected to the terminals 153 of the special rectifier. The rheostat 152 enables the heating of the filament to be regulated to the proper value. This entirety of connections to the cathode ray tube ensures that a regular scale of distance on the screen is obtained.

Figures 9 and 10 show how the image is presented on the screen of the cathode ray tube. The zone ef of reception is variable and its length is determined by means of the variable condenser 188; the placing of the point e, the commencement of the zone of reception, is regulated by means of the potentiometer resistance 190. There is shown at 1, 2, 3, 4 ... 9, 10 a scale of phosphorescent distances which permits of the direct reading of the distance. At ab, on Figure 9, is shown the impulse, not blocked, due to the direct radiation of the transmitter when the switch 182 is open (receiver not blocked); at c is shown the reflection on the obstacle located at the distance D.

When the blocking of the receiver is in operation (switch 182 closed) there is obtained, on the screen, the suppression of the initial impulse; only the reflected impulse subsists at c (Figure 10) on condition that the emission beam is reflected on the obstacle; in the same way the warning system 118 lights up either when the regulated receiver is not blocked, or when the receiver, being blocked, a reflection c is shown on the cathode ray tube.

The invention is naturally susceptible to numerous modifications in its realisation, in the scope of the combinations of members indicated, the embodiments given by way of example to make it easier to understand, being capable of admitting the substitution of particular members or of equivalent devices adapted to ensure the same operations; the use of the cathodic oscillograph in particular is not absolutely necessary. In the same way, the device suppressing the reception of close obstacles is combined with the device which supplies the distance; these two elements which constitute important objects of the invention may be carried out independently one of the other without departing from the scope thereof.

What we claim as our invention and desire to secure by Letters Patent of the United States is:

1. Apparatus for detecting obstacles by the reflection from said obstacles of very short electromagnetic waves comprising in combination a sender and a receiver, having a directional aerial, and including first, a directional sender of short impulses, regularly spaced, of very high frequency, modulated to a lower frequency, but nevertheless high enough for each impulse to contain several periods of said modulation, said directional sender including magnetic means having a magnetic field, a main oscillator having an oscillating circuit disposed in a position to influence said magnetic means and connected to the aerial of the sender, a pilot oscillator having a pilot oscillating circuit connected to the first oscillating circuit by means of electron coupling, means supplying anodic potential to the anode of the main oscillator, means for negatively polarizing the grid of said pilot valve to block the same and control emission impulses from the main oscillator by applying a negative potential to the grid of said pilot tube including a synchronizing circuit connected thereto and including a synchronization generator, said impulses being controlled by said synchronization generator so as to ensure the successive blocking the function of the receiver during the emission of the impulses and of the sender during the intervals between said impulses, and means for applying a positive potential to the grid of said pilot tube in order to unblock the same, and also, second, a receiver of very short waves having a cathodic oscillograph, a graduated scale, a receiving oscillating circuit with an oscillator connected to the aerial of said receiver and serving as an amplifier of the received impulses, a plurality of modulating valves with modulating circuits connected to said oscillating circuit and to said oscillograph, a detector valve with a detector circuit connected to said modulating circuits, and a warning signal device and capable, upon occurrence of detections, changes of frequency and amplifications, of utilizing the impulses reflected by the obstacle for actuating said warning signal device and for deflecting the beam of the cathodic oscillograph in such manner that conversion occurs on the screen of said oscillograph of the length of travel of the impulse into the distance passed by the luminous spot of the oscillograph on said graduated scale.

2. Apparatus according to claim 1, including circuit means for adjusting the duration of the blocking of the receiver so as to determine a minimum limit of range of operation greater than the distance of near obstacles on which no measurement is desired.

3. Apparatus according to claim 1, including circuit means for causing the measure of the distance obtained to be observable permanently on the screen of the cathodic oscillograph.

4. Apparatus according to claim 1, in which the length of the horizontal sweep of the cathodic oscillograph is equal to the interval between the two emitted impulses.

5. Apparatus according to claim 1, including circuit means for adjusting the duration and the phase of the blocking of the receiver at will, and for eliminating said blocking temporarily to permit adjustment of the apparatus to the emitted impulses.

6. Apparatus according to claim 1, including circuit means for causing the deflections of the cathodic beam of the oscillograph to be adjustable so as to permit the distances to be read directly upon the graduated scale.

7. Apparatus according to claim 1, in which the adjustment of the displacement of phase of the impulses is correct to two degrees, and in which the apparatus includes a bridge dephaser circuit for producing a rough adjustment, and means for producing a fine adjustment by varying the polarization of the grid of the tube generating the impulse frequency.

8. Apparatus according to claim 1, in which the adjustment of the displacement of phase of the impulses is correct to two degrees, and in which the apparatus includes a bridge dephaser for producing a rough adjustment, and means for producing a fine adjustment by varying the polarization of the grid of the tube generating the impulse frequency, said means being capable of causing a modification of the width of rectangular impulses developed in its anodic circuit.

9. Apparatus according to claim 1, in which the very high frequency generator is a magnetron valve having circuit means making it capable of being blocked by applying to its plates a higher tension than the normal tension suitable for operation.

10. A distance indicating system comprising means for radiating a field of energy, means for receiving energy reflected by objects in said field, means responsive to the received reflected energy for producing indications of the distance of each of said objects, and means for suppressing predetermined ones of said indications.

MAURICE ELIE.
HENRI GUTTON.
JEAN JACQUES HUGON.
MAURICE PONTE.

REFERENCES CITED

The following references are of record in the file of this patent:

UNITED STATES PATENTS

| Number | Name | Date |
|---|---|---|
| 2,055,883 | Terry | Sept. 29, 1936 |
| 2,143,035 | Smith | Jan. 10, 1939 |
| 2,157,122 | Dunmore | May 9, 1939 |
| 2,172,395 | McSpadden | Sept. 12, 1939 |
| 2,189,549 | Hershberger | Feb. 6, 1940 |
| 2,009,459 | Turner | July 30, 1935 |

FOREIGN PATENTS

| Number | Country | Date |
|---|---|---|
| 278,388 | Great Britain | Oct. 3, 1927 |
| 302,602 | Great Britain | May 30, 1929 |